United States Patent
Borkenhagen et al.

(10) Patent No.: US 8,488,492 B2
(45) Date of Patent: *Jul. 16, 2013

(54) ANYCAST-BASED INTERNET PROTOCOL REDIRECTION TO ALLEVIATE PARTIAL ROUTING TABLES

(75) Inventors: Jay Charles Borkenhagen, Lincroft, NJ (US); Richard Kwapniewski, Middletown, NJ (US); Thomas Bradley Scholl, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/951,282

(22) Filed: Nov. 22, 2010

(65) Prior Publication Data
US 2011/0064083 A1    Mar. 17, 2011

Related U.S. Application Data

(63) Continuation of application No. 12/286,479, filed on Sep. 30, 2008, now Pat. No. 7,864,765.

(51) Int. Cl.
*H04L 12/56* (2006.01)
*H04J 1/16* (2006.01)

(52) U.S. Cl.
USPC ............ 370/254; 370/389; 370/252; 370/238

(58) Field of Classification Search
USPC ..................... 370/389, 237, 238, 252, 254
See application file for complete search history.

(56) References Cited

U.S. PATENT DOCUMENTS

| | | | |
|---|---|---|---|
| 2005/0120135 A1* | 6/2005 | Molnar et al. | 709/242 |
| 2006/0227724 A1* | 10/2006 | Thubert et al. | 370/254 |
| 2010/0061370 A1 | 3/2010 | Gerber et al. | |

* cited by examiner

*Primary Examiner* — John Pezzlo

(57) ABSTRACT

Systems and methods are described that instruct routers having constrained hardware/memory to redirect all outbound traffic to a helper router. The helper router contains a full routing table that can forward any packet to its destination. In a large service provider network, helper routers may be distributed at multiple locations across the network. Since packets must detour through the helper router, the distributed helper routers minimize latency.

28 Claims, 10 Drawing Sheets

ANYCAST-BASED INTERNET PROTOCOL REDIRECTION TO ALLEVIATE PARTIAL ROUTING TABLES

CROSS REFERENCE TO RELATED APPLICATIONS

This application is a continuation of U.S. patent application Ser. No. 12/286,479, entitled "Anycast Based Internet Protocol Redirection to Alleviate Partial Routing Tables," filed on Sep. 30, 2008, and issued on Jan. 4, 2011 as U.S. Pat. No. 7,864,765, the disclosure of which is incorporated herein by reference in its entirety.

BACKGROUND OF THE INVENTION

The invention relates generally to network engineering.

More specifically, the invention relates to systems and methods that redirect Internet Protocol (IP) traffic from a network router with constrained hardware or memory to a helper router which contains a full set of network forwarding/routing tables which after receipt and look-up, forwards the traffic to the destination on behalf of the constrained router.

Today, network operators or Internet Service Providers (ISPs) are forced to periodically upgrade IP routing equipment to keep pace with their own internal growth as well as the rest of the Internet. Day by day, global Border Gateway Protocol (BGP) routing tables that comprise the Internet are constantly growing. This growth takes a toll on network equipment regarding memory to store routing tables and forwarding tables, and the processing power to create and maintain those tables.

Routers typically contain input ports, output ports, a specialized operating system, memory, and one or more processors. Distributed routers require memory for two purposes besides the operating system itself: storing a routing table which is used to perform routing decisions and program the forwarding table, and storing a forwarding table which is used when making forwarding decisions to forward packets out on particular interfaces.

These two functions are critical to the operation of any router employed on an IP network. Without sufficient memory, a router would be unable to properly forward packets. Due to Internet growth, network operators must upgrade their equipment to handle route growth and satisfy the above two purposes. This results in a cycle where equipment must be upgraded or replaced every 3 to 5 years. Furthermore, operators encounter scenarios where their hardware cannot be upgraded any further. This is due in part that when manufactured, there were technical limits prohibiting capacity expansion. For these cases, network operators have always been faced with replacing hardware.

Customer migrations are very complex and costly from the network operator point of view. Not only does additional hardware and capacity have to be ordered, but customers also must be notified of the inevitable service interruption. Lengthy migration strategies and tools must also be developed in order to move customers from one device to another. Additionally, to replace network hardware with state-of-the-art equipment includes major capital costs.

The challenge for network operators is to extend the operational life of their deployed networks and obviate the hardware upgrade/replacement cycle. In order to achieve this, a system and method is needed that allows a network operator to employ and distribute one or more helper routers throughout his network for resiliency, where traffic can be redirected to the closest helper router.

SUMMARY OF THE INVENTION

The inventors have discovered that it would be desirable to have a router system and method that instructs routers which are used in a network and which have constrained hardware/memory to redirect all outbound traffic to a helper router. The helper router contains a full routing table that can forward any packet received to its destination. In a large service provider network, helper routers may be distributed at multiple locations across the network. Since packets must detour through the helper router, distributing helper routers throughout the network can minimize added latency.

Embodiments enable network operators to continue to provide services on end-of-life (EOL), end-of-sale (EOS) or end-of-support hardware like routers, or the modules within a router such as route processors and line cards. Embodiments enable a network to continue to operate on existing equipment which has reached its limit to store routing or forwarding information such as a constrained router. A network operator may also base their network design using predetermined devices implemented from the beginning of service as constrained routers. This mitigates concern that these devices would require upgrade or replacement in the future. It also may allow a network operator to purchase lower cost equipment with lower memory requirements.

Embodiments allow a network operator to reduce the amount of routing and forwarding table states contained in routers by using constrained routers in conjunction with helper routers.

One aspect of the invention provides a method for configuring a network that includes a plurality of routers. Methods according to this aspect of the invention include configuring one or more helper routers, each helper router having a full routing table for the network, announcing to the network each helper router's default route using anycast-prefix addressing over a routing protocol, deleting a non-helper router's routing table upon reaching a predetermined constrained threshold, receiving a packet with a destination at a router without a routing table, matching a default route learned from the one or more helper routers at the router without a routing table, forwarding the received packet and any subsequent packets from the router without a routing table to a closest helper router where a forwarding look-up is performed based on the destination, and forwarding the packet from the helper router.

Another aspect of the invention is a method for configuring a network that includes a plurality of routers. Methods according to this aspect of the invention include configuring one or more helper routers, each helper router having a full routing table for the network, announcing to the network each helper router's default route using anycast-prefix addressing over a routing protocol, examining each non-helper routers' routing table memory capacity, predicting when a non-helper router's routing table memory capacity reaches a predetermined constrained threshold, deleting a non-helper router's routing table based upon the predetermined constrained threshold prediction, receiving a packet with a destination at a router without a routing table, matching a default route learned from the one or more helper routers at the router without a routing table, forwarding the received packet and any subsequent packets from the router without a full routing table to a closest helper router where a forwarding look-up is performed based on the destination, and forwarding the packet from the helper router.

Another aspect of the invention is a data communications network. Networks according to this aspect of the invention include a plurality of interconnected routers comprising one or more helper routers, each helper router has a full routing table and announces its default route to the network using anycast-prefix addressing over a routing protocol, and a configuration wherein the routing table memory capacity for each non-helper router is examined and if a non-helper router's routing table memory capacity reaches a predetermined constrained threshold, that non-helper router deletes its routing table.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for configuring routers as constrained routers and helper routers to maintain service throughout a network. The invention may be implemented as a modular framework and deployed as software as an application program tangibly embodied on a program storage device. The application code for execution can reside on a plurality of different types of computer readable media known to those skilled in the art.

Figure 1:
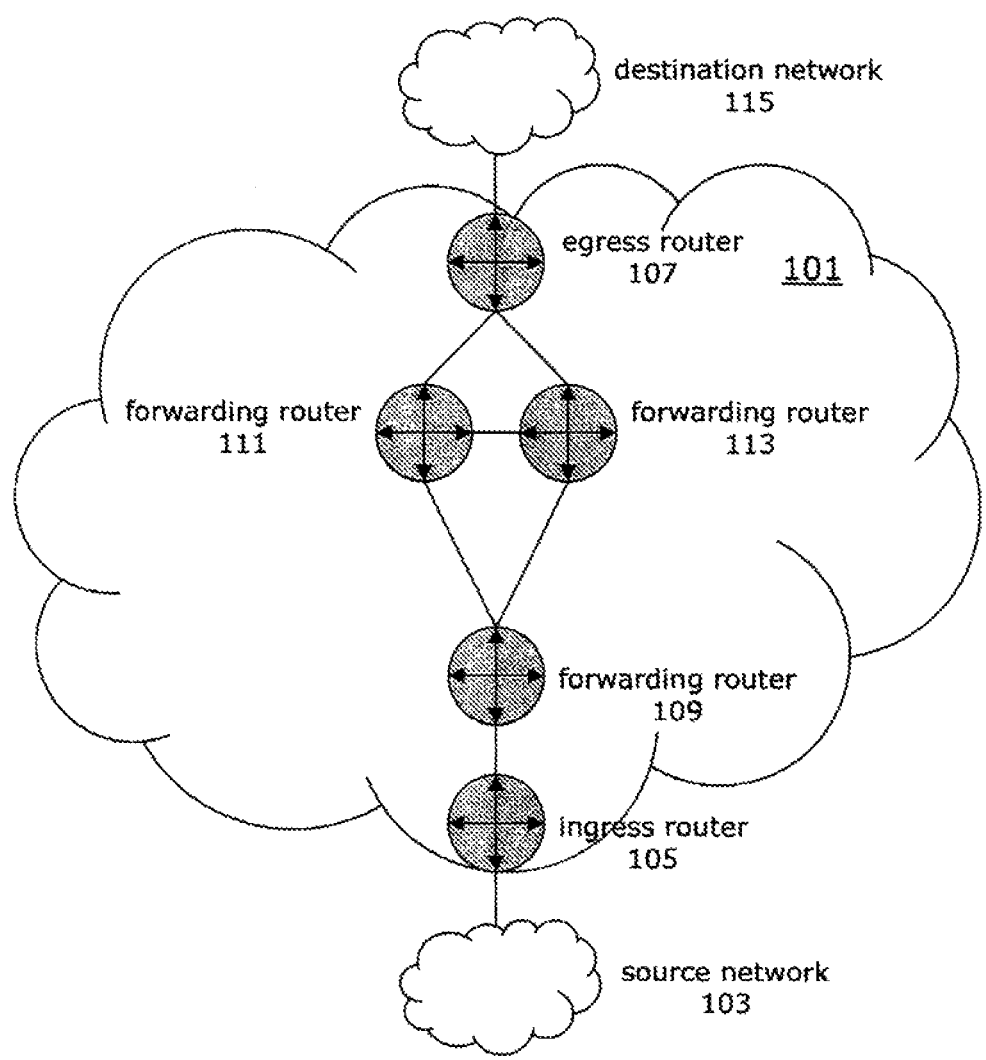
FIG. 1 is an exemplary network.

FIG. 1 shows a typical network 101 that is comprised of a plurality of routers, including a network ingress (Provider Edge (PE)) router 105, an egress (PE) router 107 and network forwarding (Provider (P)) routers 109, 111, 113 depending on the size of the network 101. P routers are strictly interior routers and do not terminate any external connections. Many P routers may be accessed between two PE routers. For example, traffic may enter a PE router in San Diego, Calif., and need to egress on a PE router in Boston, Mass., and traverse a route via a plurality of P routers from San Diego to Los Angeles to Chicago to New York to Boston. FIG. 1 also shows a source network 103 and destination network 115 for which the network 101 provides connectivity.

A router is an electronic device and/or software that connect at least two networks, such as two Local Area Networks (LANs) or Wide Area Networks (WANs), and forwards packets between them. Each packet can traverse many routers, making many hops over the Internet as well as multiple routers within a large organization.

A next hop is the next router to which a packet is sent from any given router as it traverses a network from its source to its destination. In the event that the packet is at the final router in its journey, the next hop is the final destination. A hop is the trip that a packet takes from one router to another or from the final router to the destination. A packet, also referred to as a datagram, is a fundamental unit of data transmission on the Internet and other Transmission Control Protocol/Internet Protocol (TCP/IP) networks.

Routers forward packets between networks using headers and forwarding tables to determine the best path to forward the packets. Routers work at the network layer of the TCP/IP model or layer 3 of the OSI model. Routers also provide interconnectivity between like and unlike media. This is accomplished by examining the header of a data packet, and making a decision on the next hop to which it should be sent. Routers use preconfigured static routes, status of their hardware interfaces, and routing protocols to select the best route between any two subnets.

The next hop for any particular packet at any particular point in its journey is determined, for example, in the Internet by both the Internet Protocol (IP) address of its destination as contained in its header and the routing table in the router at that point. An IP address is a unique numeric identifier for each computer or router on a TCP/IP network. A routing table is a database in a router that stores and frequently updates the IP addresses of reachable networks, called "routes" or "prefixes," and the most efficient paths to them.

Embodiments allow for a network comprising routers with limited or constrained hardware/memory to properly forward received traffic to a helper router which contains a full routing table for IP networks such as the Internet or a Virtual Private Network (VPN). Each helper router forwards a received packet to the most efficient/optimal next hop. After configuration, each helper router advertises itself to the network in order for each constrained router to learn of and prioritize each helper router location. Embodiments allow for a complete network configuration, and for configuring each network component separately, albeit with greater network operator involvement.

In prior art networks, when a router could not store a full routing/forwarding table, the router could be configured with a default route instructing the router to forward packets to a directly-connected interior router which could store the entire table. One limitation with the prior art is that it required the directly-connected interior router to contain the full routing table. In a Multiprotocol Label Switching (MPLS) network, for example, the interior routers may not contain the full routing table, since they only need to switch packets based on labels, not IP addresses. Embodiments de-couple the default routing from the physical connectivity, removing the requirement that the default route be directly-connected. This aspect allows flexibility for a network operator to deploy separate helper routers to provide the default routing, removing the need to support a full routing table on interior routers. Costs are reduced because the overall number of routers requiring the full routing table can be fewer and because less expensive interior routers can be employed, since they do not require full routing table storage capability. Another limitation with the prior art was the lack of resiliency, because a failure of the directly connected router would result in packet loss. Embodiments include the helper routers announcing the default route in anycast fashion, providing resiliency while maintaining the low latency for packets which traverse the default routing path.

Figure 3:
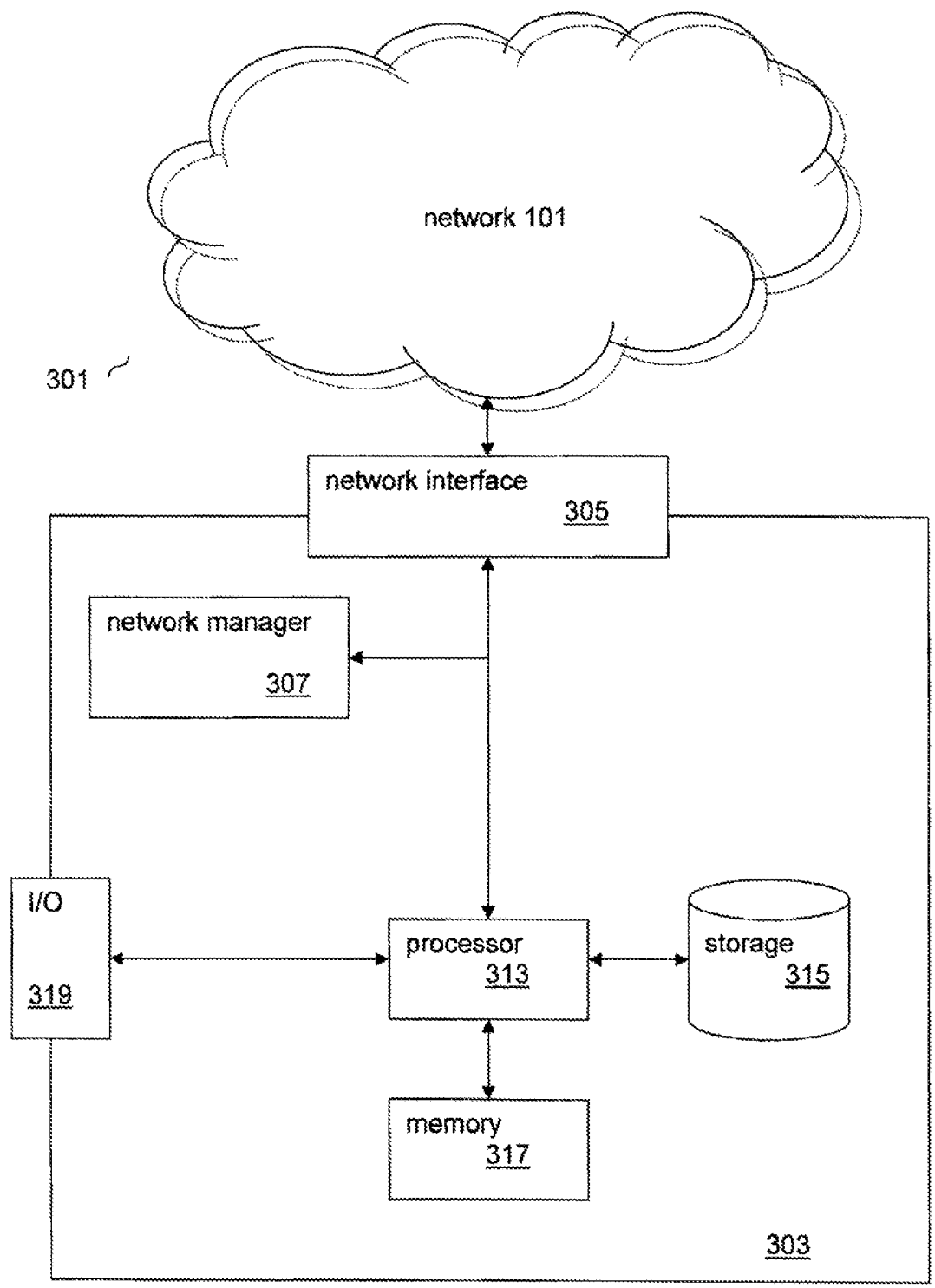
FIG. 3 is an exemplary system framework.
Figure 4:
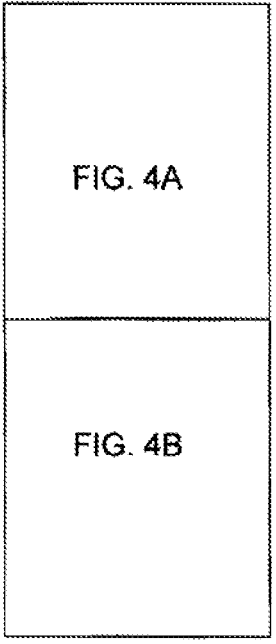
FIG. 4 is an exemplary method.
Figure 4A:
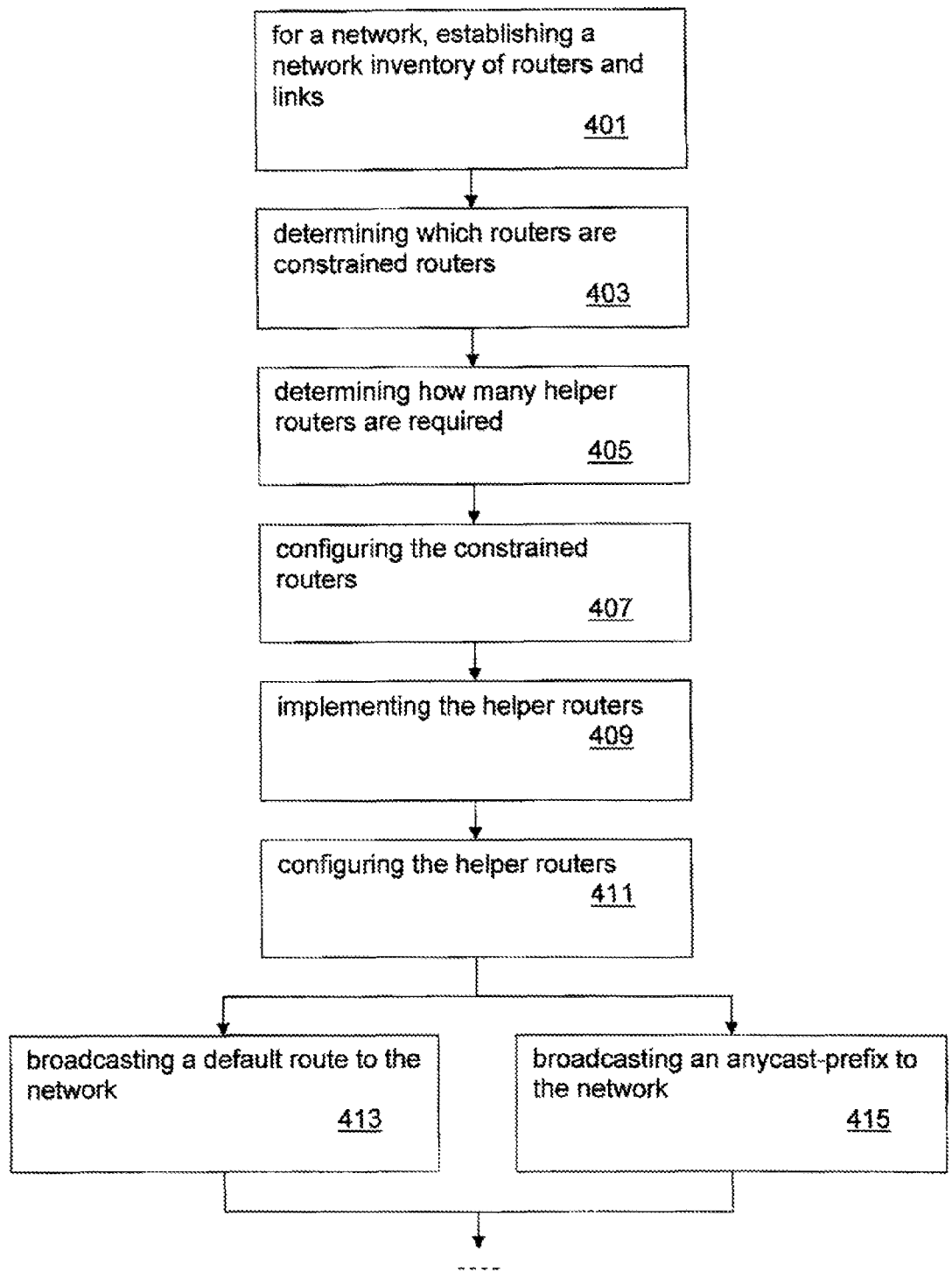
Figure 4B:
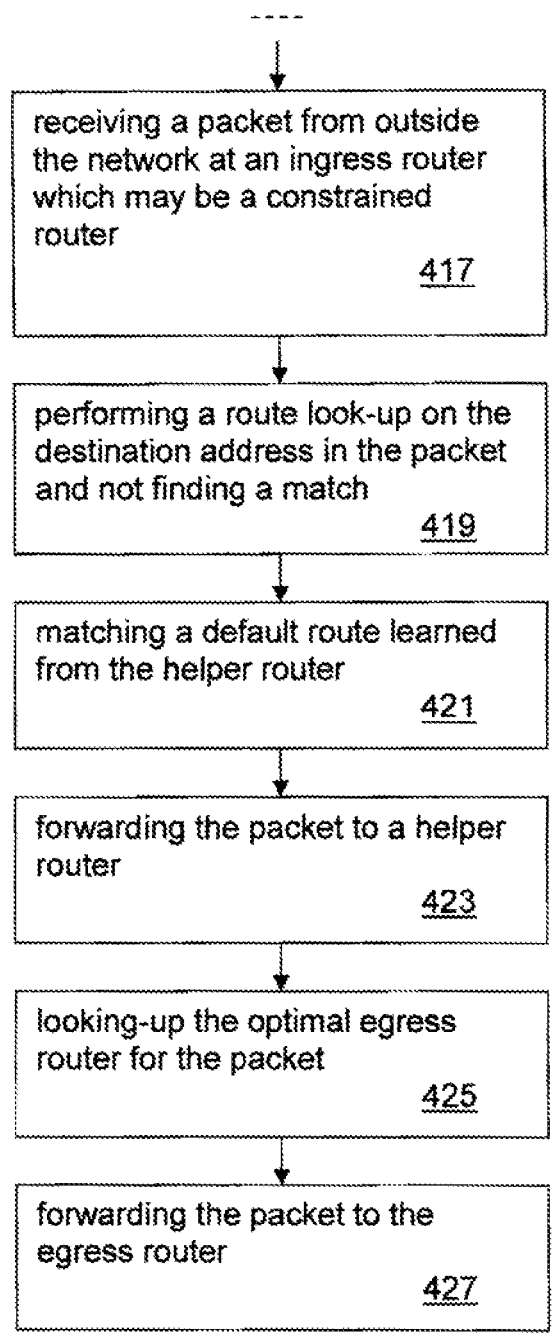

FIG. 3 shows an embodiment of a system 301 framework 303 and FIG. 4 shows a method. The framework 303 which may be part of a network management server includes a network interface 305 coupled to a network and configured to acquire network topology information, network reachability information, as well as network status information to perform network management services. The network interface 305 is coupled to a network manager/inventory database 307, and a processor 313. The processor 313 is coupled to storage 315, memory 317 and I/O 319.

The framework 303 stores acquired network data into a data store 315. The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. Embodiments may be implemented as an application defined by the computer program instructions stored in the memory 317 and/or storage 315 and controlled by the processor 313 executing the computer program instructions. The computer also includes at least one network interface 305 coupled to and communicating with a network such as shown in FIG. 1 to interrogate and receive network configuration or alarm data. The I/O 319 allows for user interaction with the computer via peripheral devices such as a display, a keyboard, a pointing device, and others.

Figure 2A:
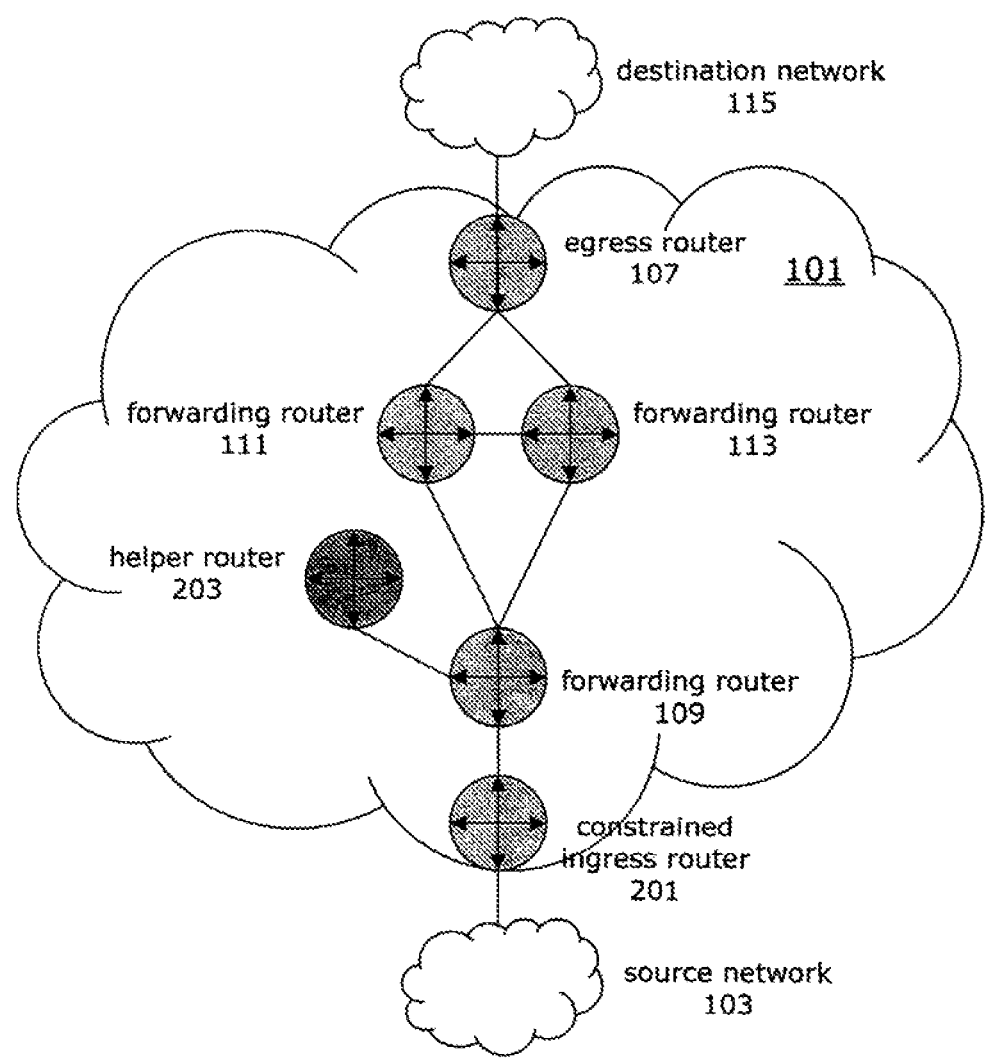
FIGS. 2A-2E is an exemplary network configuration and network flow according to one embodiment.

FIG. 2A shows an exemplary network 101 embodiment result including at least one identified constrained router 201 and at least one helper router 203. A constrained router 201 is a router where the router's memory becomes too small for the network 101 it is deployed in. Each PE or P router deployed in a network may recognize the situation where the router's memory reaches a certain threshold, and it may switch itself to a mode where it deletes its full routing table and uses the method described in this invention. For this embodiment, each router may be preconfigured by the network operator. Alternatively, each network 101 routers' memory may be periodically examined by a network operator or system framework 303 to predict future constrained router candidates.

A helper router 203 is a conventional router having a memory with sufficient capacity for the network in which it is deployed and may be a router sourced from Cisco or Juniper. The functionality of a helper router 203 is that of a detour. In a prior art network, traffic traverses the shortest path between a PE (ingress) router to a PE (egress) router over one or more P routers. However, if the ingress router does not know how to route the traffic to the egress router, it forwards the traffic to the helper router 203 which contains a full routing table. Embodiments exploit the functionality of how the helper router 203 is used within a network 101.

In networks running BGP, Route Reflectors (RRs) are commonly deployed. RRs are routers which may be dedicated to perform route exchange only, i.e. they may not forward customer data packets. The RRs learn routes from PEs and send them to other PEs and other RRs which become RR clients. This way, each PE does not need to communicate with every other PE—they use RRs as intermediaries.

The functions of the helper router 203 may be implemented on a device performing other functions such as a PE or P router, or implemented on dedicated physical devices.

In a defined network 101, an inventory is performed of all PE and P routers and links (step 401). The method determines using set thresholds, or prediction, which routers are constrained routers 201 or constrained router candidates 201 based upon router memory and network 101 routing table size (step 403). After constrained routers 201 are identified and configured (step 407), helper routers must be determined (step 405). The helper routers may be selected from the remaining pool of PE and P routers having sufficient memory, or may be additional routers. Each constrained router 201 and helper router 203 is configured to support the methodology.

The number of helper routers may be determined based on three factors: latency requirements, capacity requirements, and redundancy requirements. When a constrained router forwards packets using a helper router, the packets are traversing a non-optimal path through the network, i.e. a detour. Sufficient helper routers must be implemented to maintain the network operator's latency requirements. One example may be to implement one helper router in each city. Regarding capacity, the helper routers must be sized to meet the expected concurrent traffic load from all constrained routers. For example, $$\sum_i \text{Capacity Helper Router }(i) \geq \sum_j \text{Load Constrained Router }(j), \qquad (1)$$

where i is the number of helper routers and j is the number of constrained routers.

Additional helper routers may need to be implemented if redundancy is required. For example, if 1:1 redundancy is required to protect against failure of any single helper router, twice the number of helper routers will be required than otherwise.

After the number of helper routers is determined, each is configured to store a full network routing table (steps 409, 411). Each helper router announces itself to the network (steps 413, 415).

A helper router announces itself to the network in an "anycast" fashion. On an IP network, there is typically a one-to-one mapping of an IP address to an endpoint. Anycast is a method which creates a one-to-many mapping of an IP address to endpoints. Since the same IP address is announced by multiple endpoints, a network device must perform a routing decision to select which anycast IP address is best. This decision is typically performed by routers using some routing metric which measures which anycast IP address is "closest" from its perspective.

To determine helper router 203 proximity, one or more techniques may be employed. In one embodiment, each helper router 203 may originate the default route (0.0.0.0/0) via anycast using BGP routing protocol. The default route is advertised into the routing domain (step 413). This results in each network device learning multiple copies of the default route, each pointing towards a different helper router as its BGP next-hop. Each device will select the "closest" helper router. If route reflectors are employed in network 101, route-reflector topology will select the "closest" helper router. This is performed by selecting the default route with the lowest routing metric, which is part of the standard BGP path selection criteria used by BGP routers. The routing metric can be determined through a routing protocol such as Open Shortest Path First (OSPF), Intermediate System to Intermediate System (IS-IS), Routing Information Protocol (RIP), Interior Gateway Routing Protocol (IGRP), and others, or through manual configuration by a network operator.

In another embodiment, helper router proximity is determined by each helper router 203 originating a unique prefix into the network via anycast using OSPF, IS-IS, RIP, IGRP, or others. Each constrained router 201 learns each helper router's 203 anycast prefix (step 415). Each constrained router 201 may have a static default route pointing to the anycast prefix pre-configured by a network operator. Based upon the anycast prefix(es), each constrained router 201 will select the "closest" helper router based upon which has the lowest routing metric, which is typically the shortest latency path.

Figure 2B:
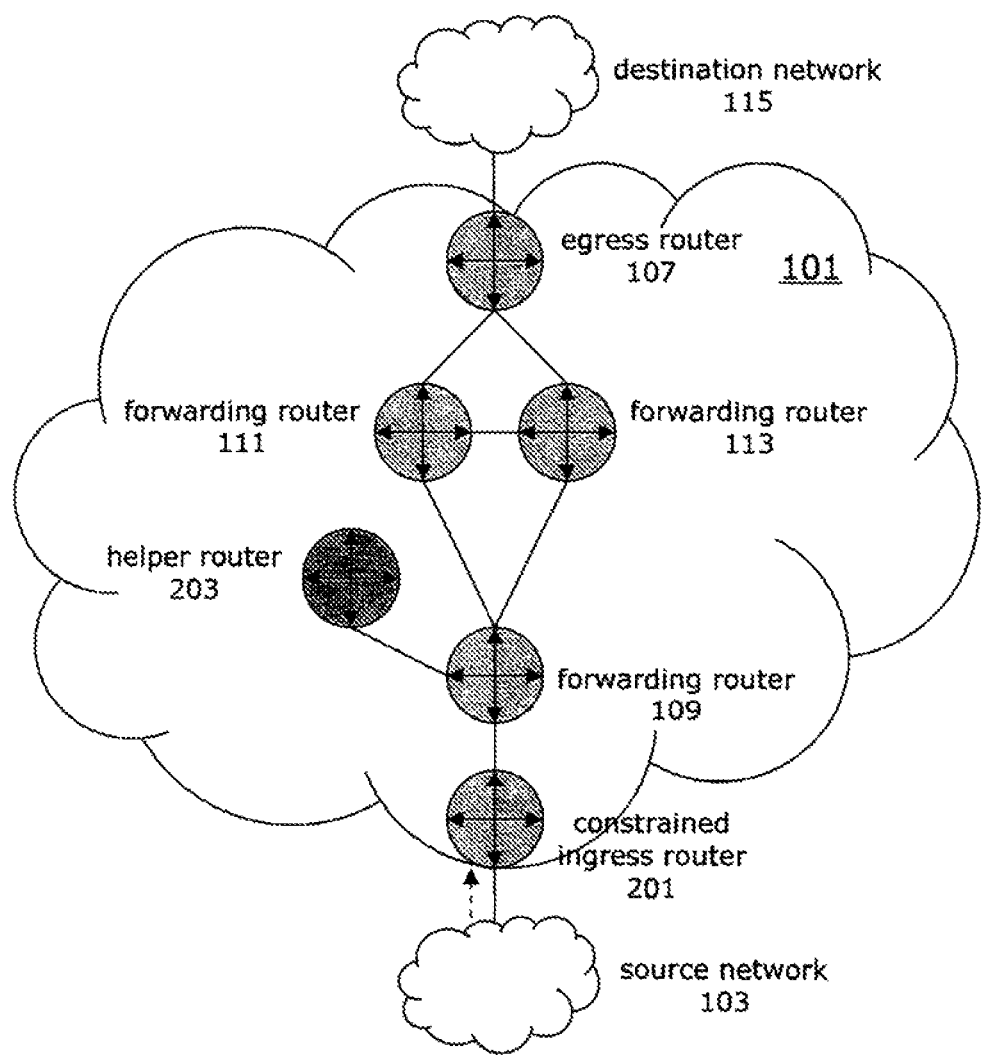

A datagram/packet (FIG. 2B, traffic flow is shown as a broken line) is received from outside the network 101 at a PE router 105 which may be a constrained router 201 (step 417). The constrained router 201 receives the packet destined for a network outside of the network 101. The constrained router 201 performs a route look-up on the destination address in the packet and does not find an exact match (step 419). The constrained router uses the default route learned from the helper routers (step 421).

An advantage provided by the use of anycast is that in case of failure of one or more helper routers, the remaining helper routers are used to continue to support the constrained routers. For example, if n helper routers are implemented and m of those helper routers fail (m<n), the anycast prefix is still known to all constrained routers from the remaining (n−m) helper routers. Furthermore, each constrained router still chooses the best available helper router which is still available, i.e., if the "closest" helper router becomes unavailable, the constrained router automatically begins forwarding packets to the "next-closest" helper router, helping ensure that packets are traversing the most optimal available path through the network.

Figure 2C:
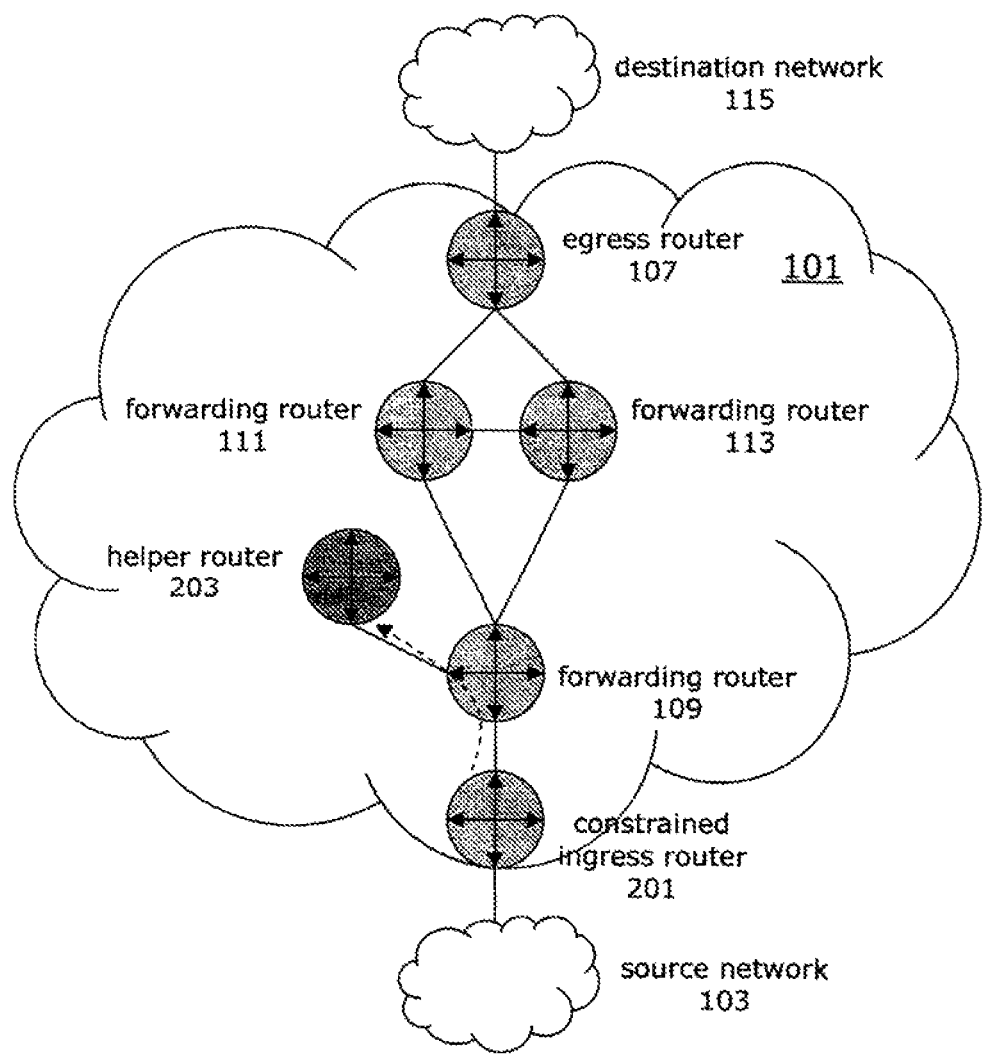

The constrained router 201 forwards the packets for that destination to the closest helper router 203 as defined by the routing metrics employed in the network topology (step 423) (FIG. 2C).

Figure 2D:
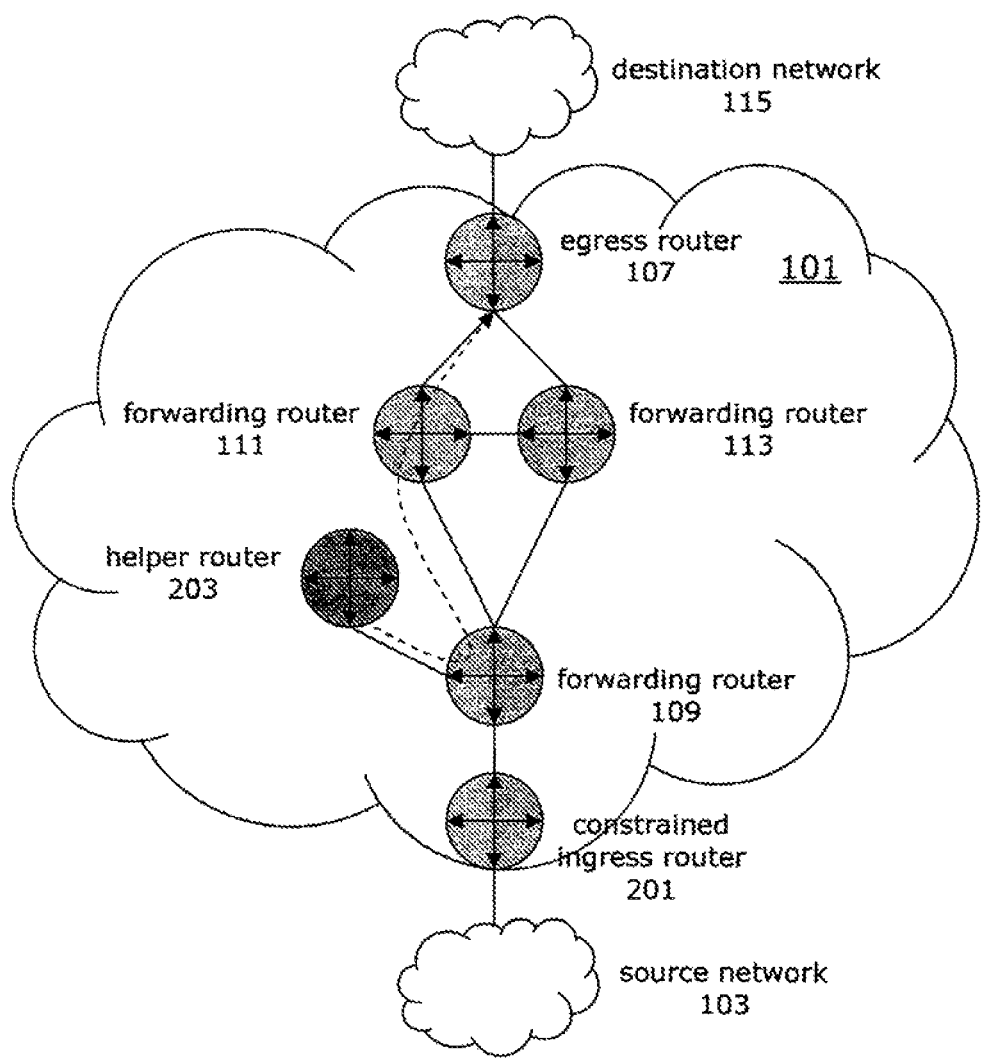
Figure 2E:
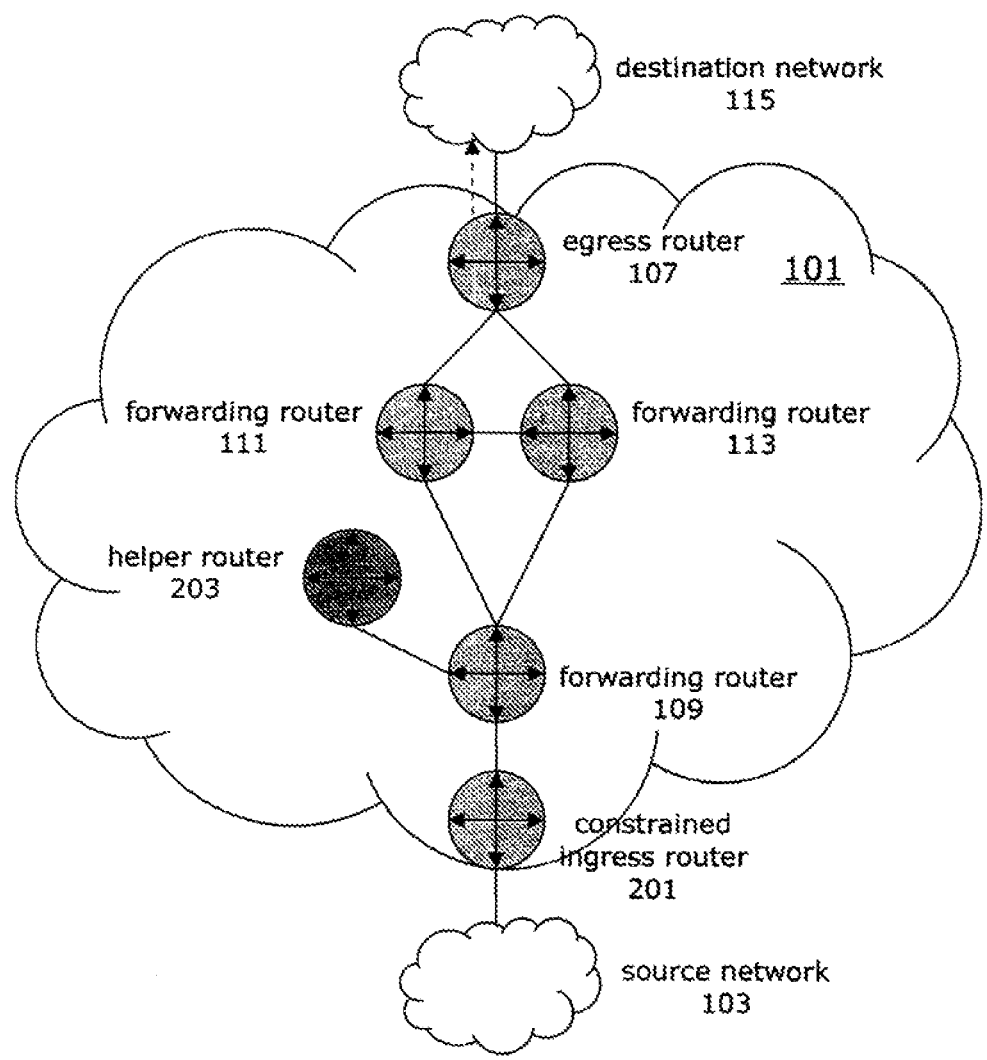

Upon receiving a packet, the helper router 203 performs a forwarding look-up (step 425). The helper router 203 identifies the most optimal network PE (egress) router 107. The helper router 203 forwards the packet to the egress router (step 427) (FIGS. 2D, 2E).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for configuring a network that includes a plurality of routers comprising:
   configuring one or more helper routers, each helper router having a full routing table for the network;
   announcing to the network each helper router's default route using anycast prefix addressing over a routing protocol;
   deleting a non helper router's routing table upon reaching a predetermined constrained threshold;
   receiving a packet with a destination at a router without a routing table;
   matching a default route learned from the one or more helper routers at the router without a routing table;
   forwarding the received packet and any subsequent packets from the router without a routing table to a closest helper router where a forwarding look up is performed based on the destination; and
   forwarding the packet from the helper router.

2. The method according to claim 1 wherein a helper router contains a full routing table for networks such as the Internet or a Virtual Private Network (VPN).

3. The method according to claim 1 wherein the predetermined constrained threshold is a memory capacity that is less than that required for the network's full routing table.

4. The method according to claim 1 further comprising for each router without a routing table, prioritizing each helper router's location in the network.

5. The method according to claim 1 further comprising for each router without a full routing table, pointing a static default route to the anycast prefix.

6. The method according to claim 1 wherein each helper router forwards a received packet to an optimal next hop.

7. The method according to claim 1 further comprising distributing the one or more helper routers throughout the network.

8. The method according to claim 1 further comprising configuring one or more Route Reflectors (RR) to select the helper router for routers without a routing table.

9. The method according to claim 8 further comprising selecting the nearest helper router for routers without a routing table based on the lowest helper router routing metric.

10. A method for configuring a network that includes a plurality of routers comprising:
    configuring one or more helper routers, each helper router having a full routing table for the network;
    announcing to the network each helper router's default route using anycast prefix addressing over a routing protocol;
    examining each non helper routers' routing table memory capacity;
    predicting when a non helper router's routing table memory capacity reaches a predetermined constrained threshold;
    deleting a non helper router's routing table based upon the predetermined constrained threshold prediction;
    receiving a packet with a destination at a router without a routing table;
    matching a default route learned from the one or more helper routers at the router without a routing table;
    forwarding the received packet and any subsequent packets from the router without a full routing table to a closest helper router where a forwarding look up is performed based on the destination; and
    forwarding the packet from the helper router.

11. The method according to claim 10 wherein a helper router contains a full routing table for networks such as the Internet or a Virtual Private Network (VPN).

12. The method according to claim 10 wherein the predetermined constrained threshold is a memory capacity that is less than that required for the network's full routing table.

13. The method according to claim 10 further comprising for each router without a routing table, prioritizing each helper router's location in the network.

14. The method according to claim 10 further comprising for each router without a full routing table, pointing a static default route to the anycast prefix.

15. The method according to claim 10 wherein each helper router forwards a received packet to an optimal next hop.

16. The method according to claim 10 further comprising distributing the one or more helper routers throughout the network.

17. The method according to claim 10 further comprising configuring one or more Route Reflectors (RR) to select the helper router for routers lacking a routing table.

18. The method according to claim 17 further comprising selecting the nearest helper router for routers without a routing table based on the lowest helper router routing metric.

19. A data communications network comprising:
a plurality of interconnected routers comprising one or more helper routers, each helper router has a full routing table and announces its default route to the network using anycast prefix addressing over a routing protocol; and
a configuration wherein the routing table memory capacity for each non helper router is examined and if a non helper router's routing table memory capacity reaches a predetermined constrained threshold, that non-helper router deletes its routing table.

20. The data communications network according to claim 19 wherein the configuration further comprises a router without a routing table forwards received packets having a destination address to the closest helper router where a next hop look up for that destination is performed.

21. The data communications network according to claim 19 wherein a predetermined constrained threshold is a memory capacity that is less than that required for the network's full routing table.

22. The data communications network according to claim 20 wherein the configuration of each router without a routing table is further configured to prioritize each helper router's location in the network.

23. The data communications network according to claim 20 wherein the configuration of routers without a routing table is further configured to receive anycast prefixes from each helper router wherein a static default route points to the anycast prefix.

24. The data communications network according to claim 20 wherein each helper router is further configured to forward a received packet to an optimal next hop.

25. The data communications network according to claim 19 wherein the one or more helper routers are distributed throughout the network.

26. The data communications network according to claim 19 wherein the routing protocol is comprised of at least one of Border Gateway Protocol (BGP), Open Shortest Path First (OSPF), Intermediate System to Intermediate System (IS IS), Routing Information Protocol (RIP) and Interior Gateway Routing Protocol (IGRP).

27. The data communications network according to claim 20 wherein the configuration further comprises one or more Route Reflectors (RR) configured to select the closest router having a full routing table for routers lacking a full routing table.

28. The data communications network according to claim 27 wherein an RR selects the nearest helper router for routers without a routing table based on the lowest helper router routing metric.

* * * * *